US011498164B2

(12) United States Patent
Kvalheim et al.

(10) Patent No.: US 11,498,164 B2
(45) Date of Patent: Nov. 15, 2022

(54) ROTARY SCREW CHANGING DELIVERY SYSTEM

(71) Applicant: KVAL, INC., Petaluma, CA (US)

(72) Inventors: Gerald Kvalheim, Petaluma, CA (US); Scott Bacon, Petaluma, CA (US); David Schneider, Petaluma, CA (US)

(73) Assignee: KVAL, INC., Petaluma, CA (US)

( * ) Notice: Subject to any disclaimer, the term of this patent is extended or adjusted under 35 U.S.C. 154(b) by 0 days.

(21) Appl. No.: 17/472,876

(22) Filed: Sep. 13, 2021

(65) Prior Publication Data

US 2021/0402533 A1 Dec. 30, 2021

Related U.S. Application Data

(62) Division of application No. 15/706,684, filed on Sep. 16, 2017, now Pat. No. 1,123,827.

(51) Int. Cl.
*B23P 19/00* (2006.01)
*B27M 3/00* (2006.01)
*G05B 19/409* (2006.01)

(52) U.S. Cl.
CPC .......... *B23P 19/004* (2013.01); *B23P 19/007* (2013.01); *B27M 3/0006* (2013.01); *B23P 2700/08* (2013.01); *B65H 2551/18* (2013.01); *G05B 19/409* (2013.01); *G05B 2219/33192* (2013.01); *Y10T 29/24* (2015.01); *Y10T 29/49902* (2015.01); *Y10T 29/49947* (2015.01); *Y10T 29/53313* (2015.01); *Y10T 29/53383* (2015.01)

(58) Field of Classification Search
CPC .................................................... B23P 19/004
See application file for complete search history.

(56) References Cited

U.S. PATENT DOCUMENTS

| 3,772,757 A | * | 11/1973 | Goldstein | B23Q 7/10 29/790 |
| 3,889,343 A | * | 6/1975 | Miller | B23P 19/003 81/433 |
| 5,222,290 A | | 6/1993 | Kvalheim | |
| 5,331,732 A | | 7/1994 | Kvalheim | |

(Continued)

FOREIGN PATENT DOCUMENTS

JP 01301478 A 12/1989

*Primary Examiner* — Sarang Afzali
(74) *Attorney, Agent, or Firm* — The Roy Gross Law Firm, LLC; Roy Gross

(57) ABSTRACT

Techniques are disclosed for remotely switching screw color or screw type feeding into a door assembly machine with an auto-hinge applicator. An apparatus having a turntable is supported on bearings and a framework. Each side of the turntable includes a screw hopper accessible via a rotary index. The screw hoppers receive a user input to make a screw selection. Upon receiving a selection, one of the hoppers indexes into position, allowing the correct screw to feed to the hinge applicator. Screw feed-hoses from screwdrivers on the hinge applicator are arranged to connect to a manifold below the screw hoppers. Screws drop from the hoppers into a manifold, at which point the screws are blown with compressed air through the feed-hoses to the screwdrivers on the hinge applicator. Screws can be reloaded into the screw hoppers when rotated in alignment with the hinge side of the door assembly machine.

8 Claims, 7 Drawing Sheets

(56) References Cited

U.S. PATENT DOCUMENTS

| | | |
|---|---|---|
| 5,425,473 A | 6/1995 | Kvalheim |
| 6,162,009 A | 12/2000 | Kvalheim |
| 6,398,004 B1 | 6/2002 | Kvalheim |
| 6,561,238 B2 | 5/2003 | Knighten |
| 6,672,341 B2 | 1/2004 | Bartholomew et al. |
| 6,772,026 B2 | 8/2004 | Bradbury et al. |
| 7,273,157 B2 | 9/2007 | Kvalheim |
| 7,422,135 B2 | 9/2008 | Kvalheim |
| 7,461,674 B2 | 12/2008 | Kameoka et al. |
| 7,648,047 B2 | 1/2010 | Lewis et al. |
| 7,730,608 B2 | 6/2010 | Kvalheim |
| 8,571,486 B2 | 10/2013 | Gasperi et al. |
| 9,207,664 B2 | 12/2015 | Wielebski et al. |
| 9,409,227 B2 | 8/2016 | Ivo et al. |
| 2006/0217831 A1 | 9/2006 | Butterworth et al. |

\* cited by examiner

ROTARY SCREW CHANGING DELIVERY SYSTEM

CROSS REFERENCE TO RELATED APPLICATIONS

This invention is a divisional application of U.S. Ser. No. 15/706,684 filed Sep. 16, 2017, now U.S. Pat. No. 11,123,827. The content of this application are incorporated by reference in its entirety.

FIELD OF THE INVENTION

This invention generally relates to applying hinges on door units for installation in building construction and particularly remotely switching screws feeding into a door assembly machine.

BACKGROUND OF THE INVENTION

Door units generally comprise a door and a doorframe. The doorframe comprises a doorjamb at either vertical side of the door and a header, the horizontal member above the door connecting the two jambs. Hinges attach the door to one of the jambs for opening and closing the door. Two, three, or four hinges are normally applied, spaced apart along the door side edge and jamb margin. Types of hinges used can vary depending on the type of door and doorframe for installation. When applying the hinges to the door or jamb, operators need to change screw colors or sizes multiple times during any given time period.

In order to change screw colors or sizes, existing methods require an operator to stop the production line to manually remove or add screws, which can significantly delay the production process over time. Additionally, manually removing or adding screws can lead to logistical issues as well as quality control issues. In this regard, the invention described herein addresses these problems.

SUMMARY OF THE INVENTION

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

In various embodiments, the present rotary screw changing delivery system for a door assembly machine with an auto-hinge applicator comprises an apparatus having a four-sided turntable that is supported on heavy-duty bearings and a framework. Each of the sides of the turntable comprises a screw hopper that can be accessed via a rotary index that can be driven via a motor (e.g., a servo motor) and gear system that can move the turntable in 90-degree increments for providing access to each screw hopper.

Screw feed-hoses connected to screw drivers on the hinge applicator of the door assembly machine are arranged to connect to a manifold below the screw hoppers mounted on the turntable. Screws drop can gravitationally downward from the screw hoppers into the manifold, at which point the screws are blown with compressed air through the screw feed-hoses to the screw drivers on the hinge applicator.

The system further comprises a memory unit having instructions stored thereon, the memory unit connected to a processor for executing the instructions to result in a user interface that includes a touch screen for allowing a user to make the correct screw selection. Upon making a selection, one of the four screw hoppers automatically indexes into position, allowing the correct screw to feed to the hinge applicator after the previous hinge is attached and hinge applicator has un-clamped.

The number of auto screw-drops is at least partially based on the number of hinges selected for processing on the door assembly machine. If an operator error occurs, the user can clear the previous selection and select the correct screw hopper on the user interface in order to re-feed screws. Screws can be reloaded into the screw hoppers when rotated in alignment with the hinge side of the door assembly machine. In various embodiments, the user can make a selection for manual feed by deactivating auto-feed function on the user interface and using a push-button mounted on the hinge applicator when feeding the screws.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Techniques are disclosed for remotely switching screw color or screw type feeding into a door assembly machine with an auto-hinge applicator. The claimed subject matter can be implemented as a method, apparatus, or article of manufacture using standard programming and/or engineering techniques to produce software, firmware, hardware, or any combination thereof to control a computer to implement the disclosed subject matter.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or." Additionally, the articles "a" and "an" as used in this application and the appended claims should generally be construed to mean "one or more" or "at least one" unless specified otherwise or clear from context to be directed to a singular form.

Figure 1:
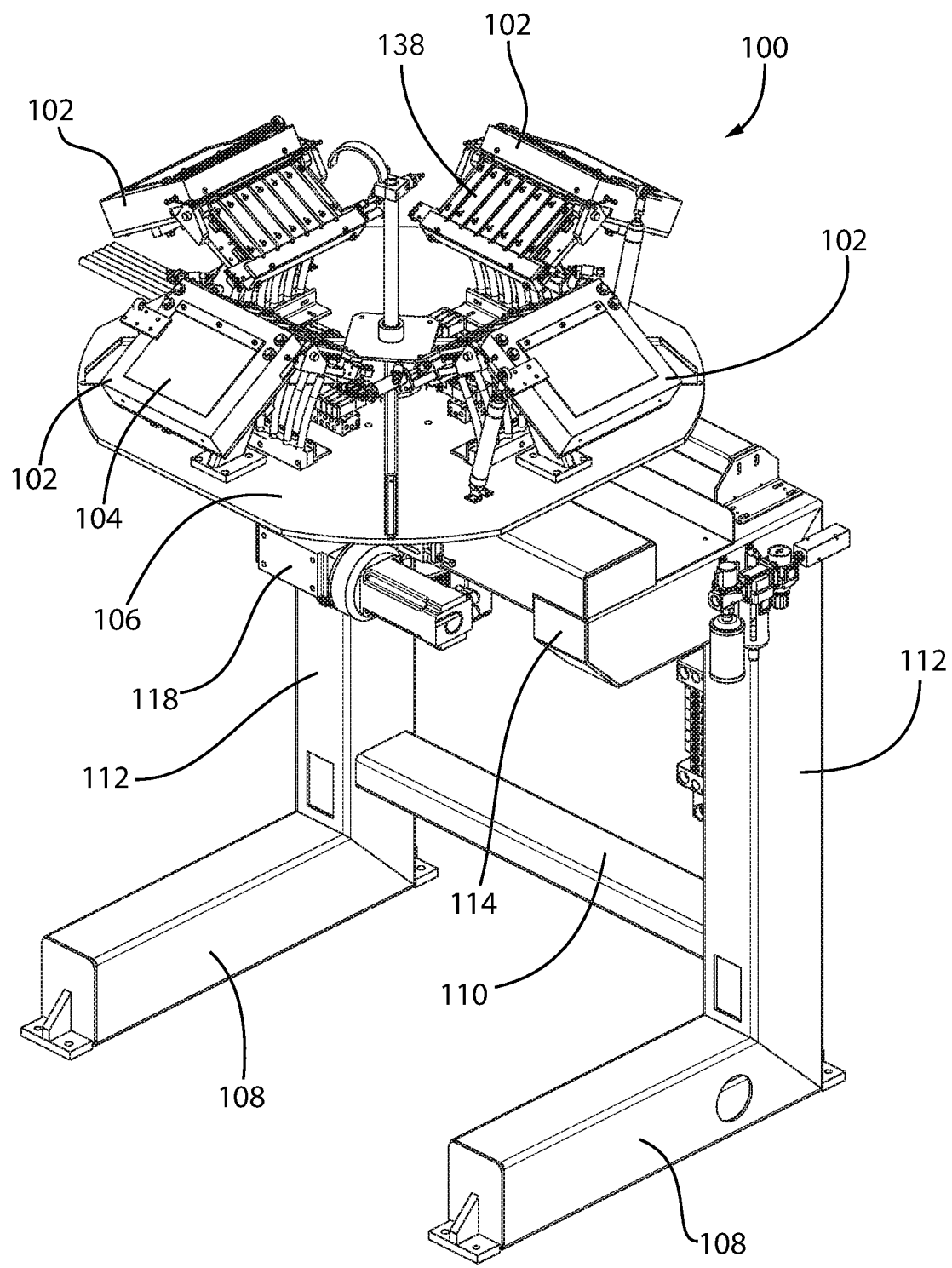
FIG. 1 shows a front perspective view of the apparatus of the rotary screw changing delivery system.
Figure 2:
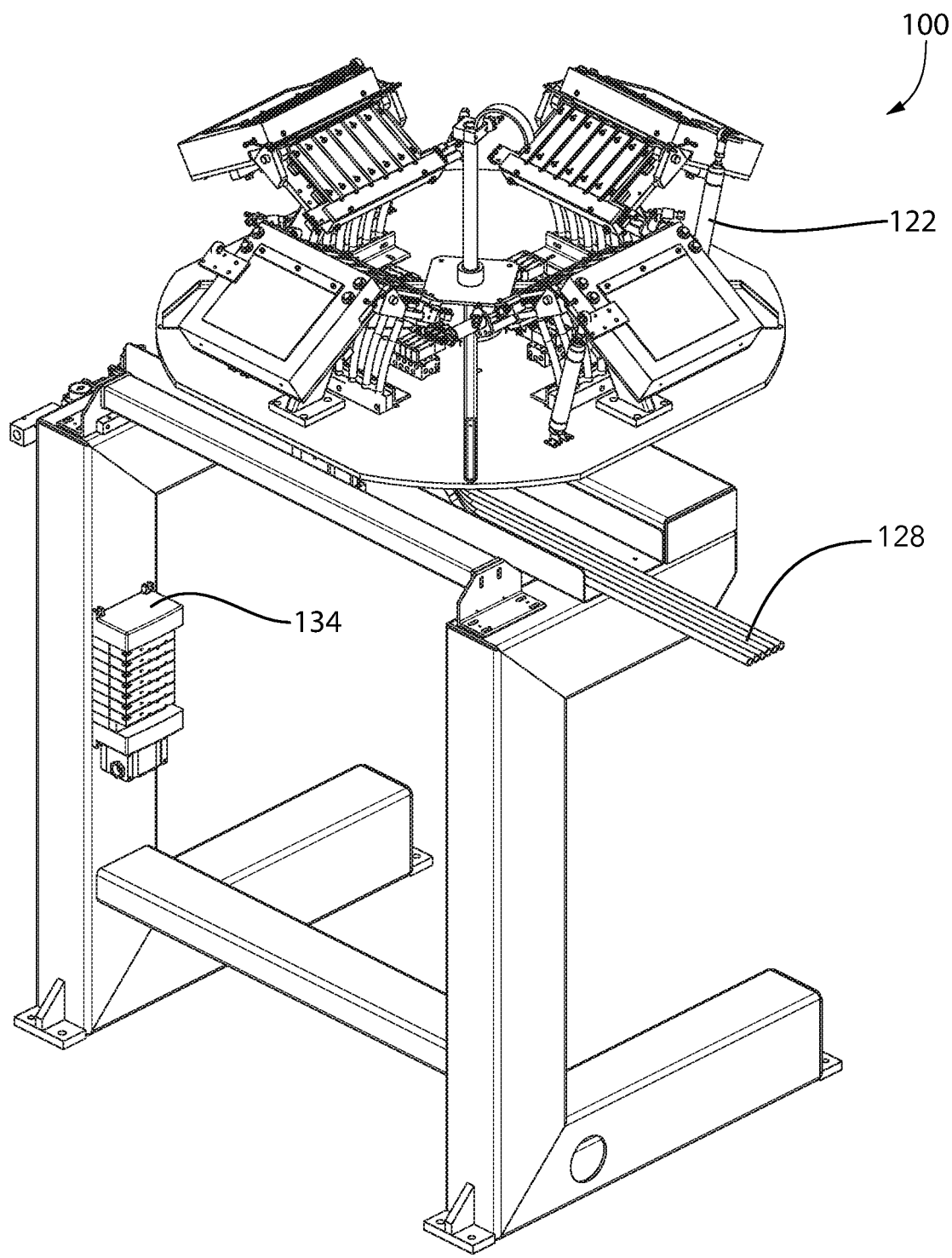
FIG. 2 shows a rear perspective view of the apparatus of the rotary screw changing delivery system.
Figure 3:
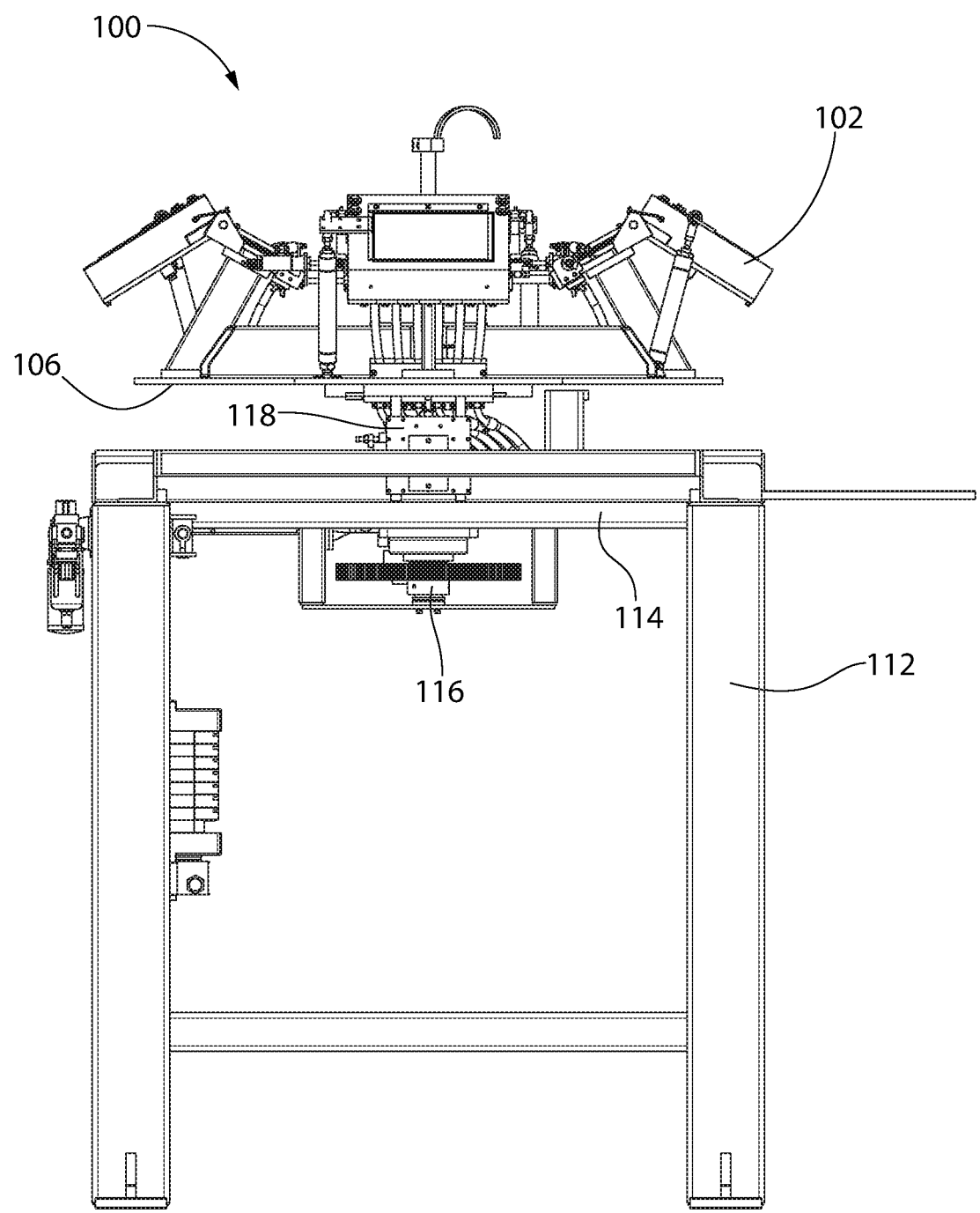
FIG. 3 shows a front planar view of the apparatus of the rotary screw changing delivery system.
Figure 4:
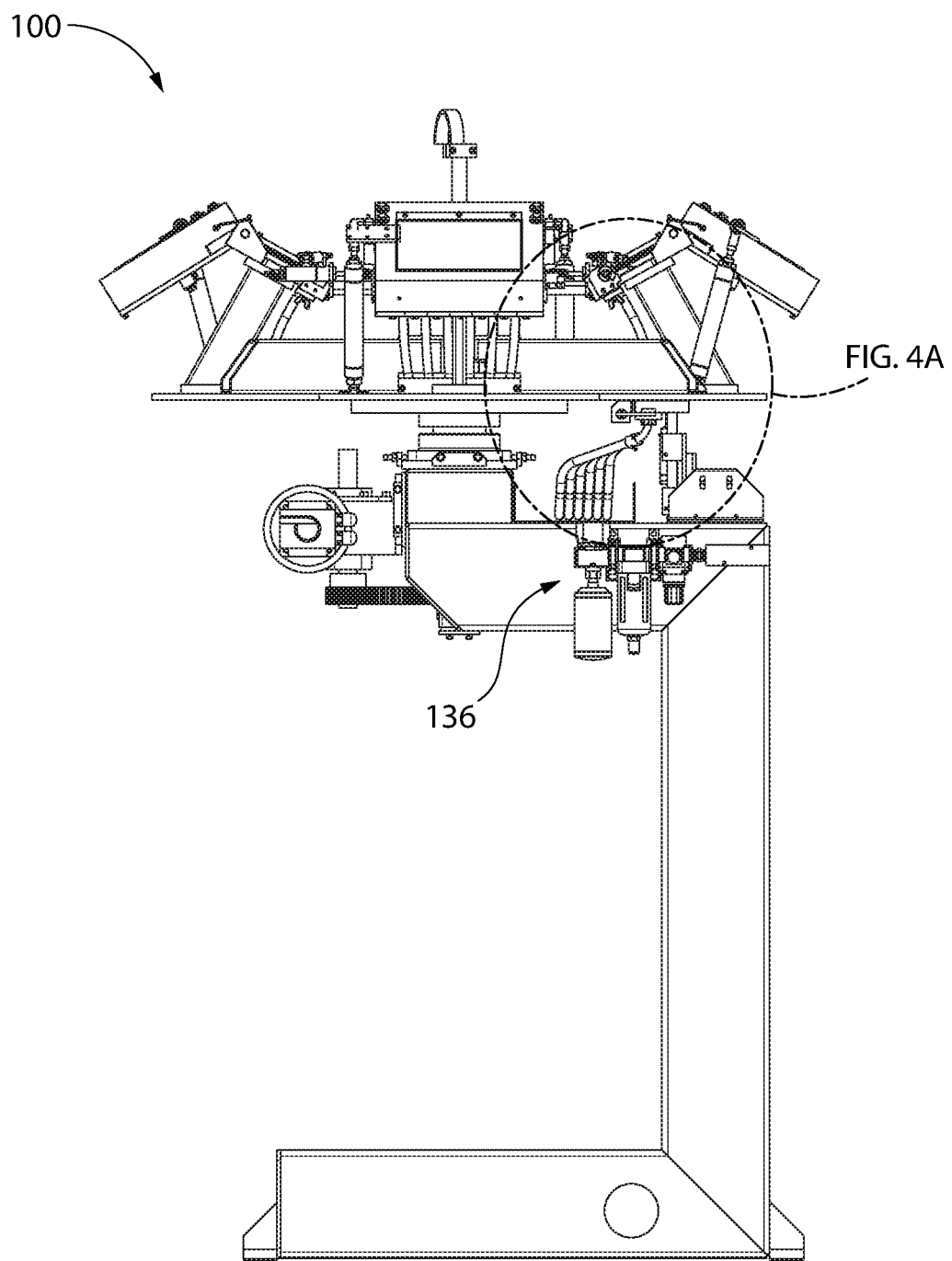
FIG. 4 shows a side planar view of the apparatus of the rotary screw changing delivery system.
Figure 4A:
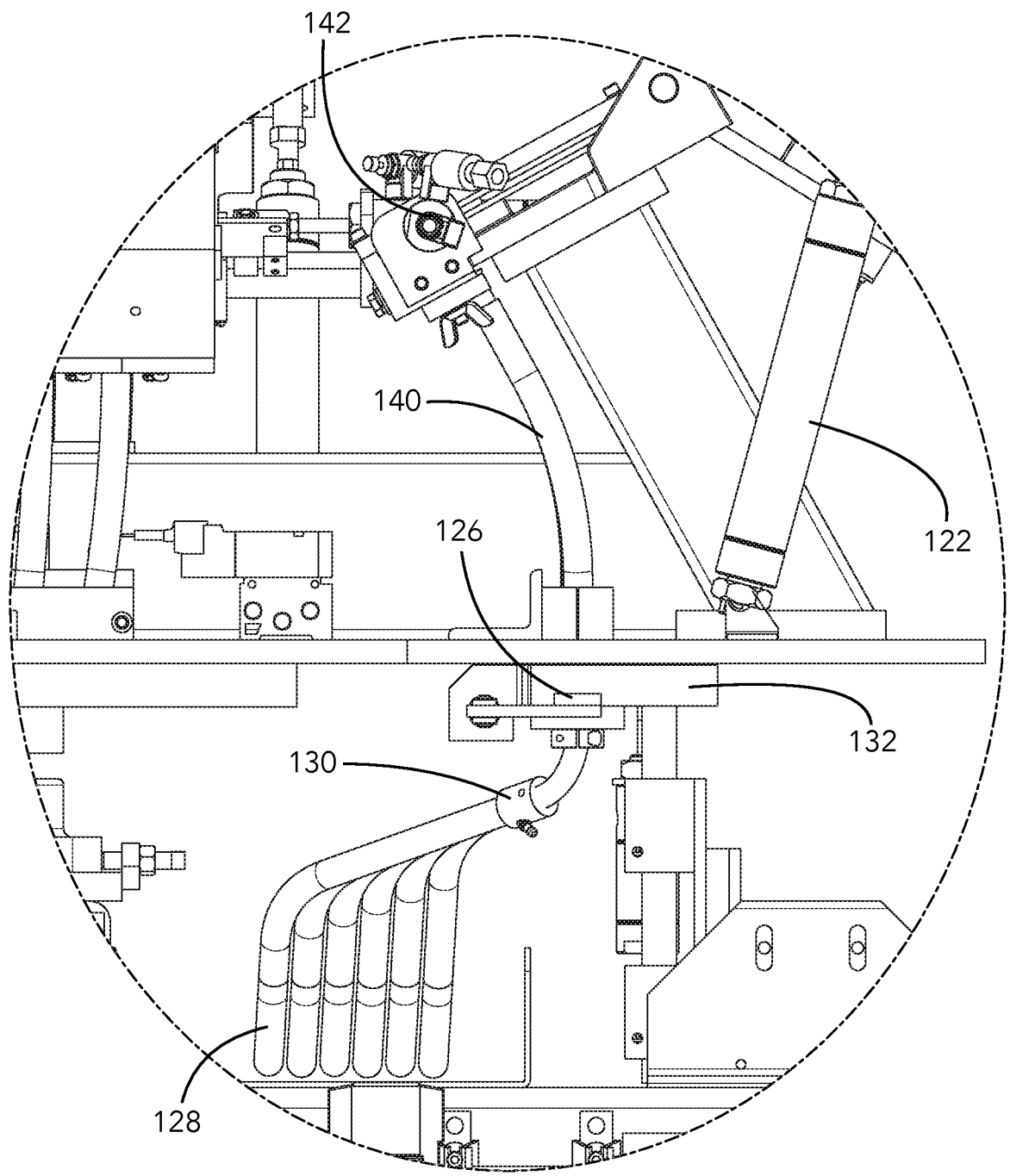
FIG. 4A shows a close-up view of a fragmentary portion taken of the circular portion designated FIG. 4A of the side planar view of FIG. 4 of the present invention.
Figure 5:
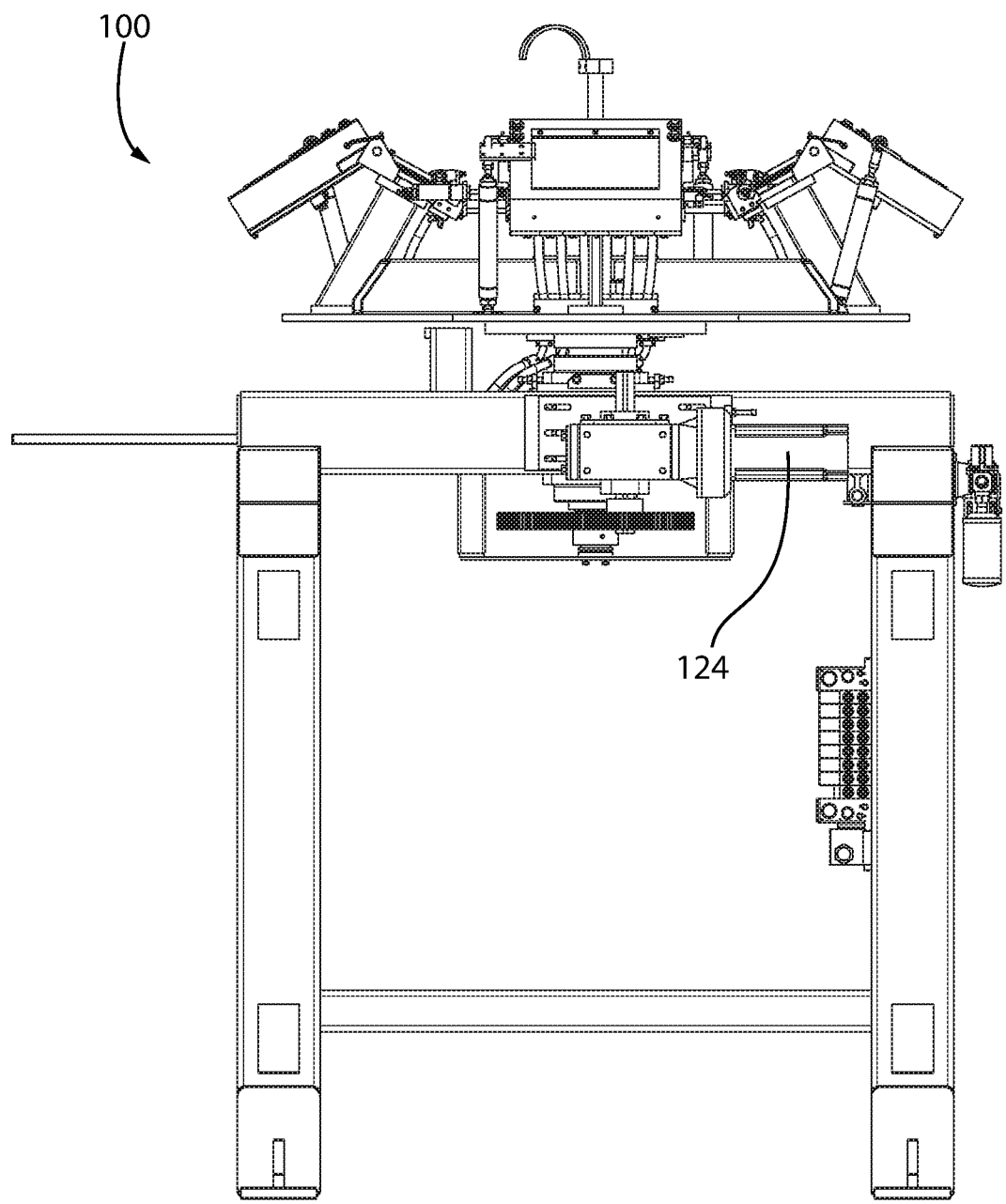
FIG. 5 shows a rear planar view of the apparatus of the rotary screw changing delivery system.
Figure 6:
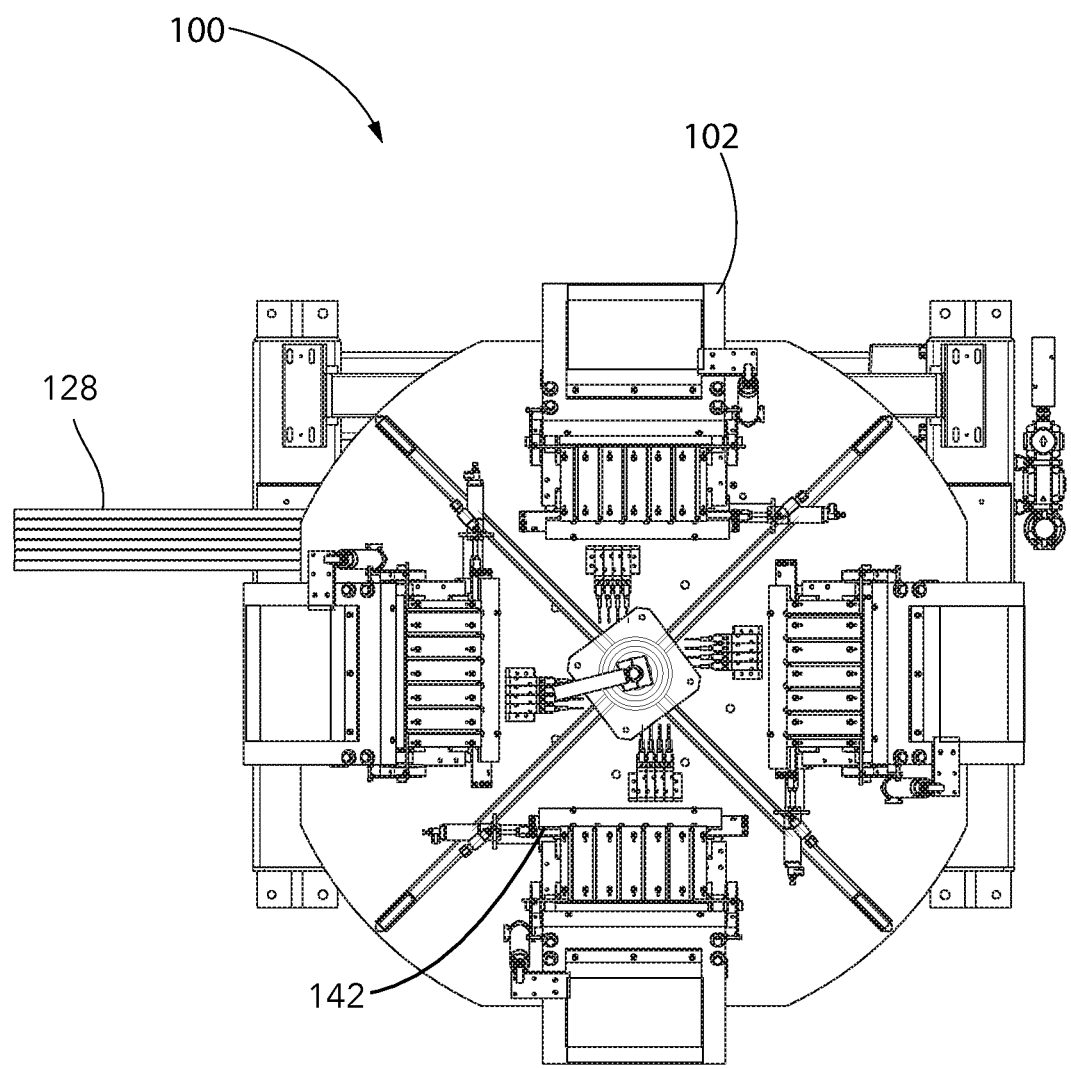
FIG. 6 shows a top-down view of the apparatus of the rotary screw changing delivery system.

The techniques described herein may be implemented in a number of ways. Example implementations are provided below with reference to the following FIGS. 1-6.

Example Apparatus

FIGS. 1 through 6 depict various views of the exemplary apparatus of the present invention. The apparatus 100 comprises a four-sided turntable 106 that is supported on heavy-duty bearings to provide free rotation around a fixed y-axis about the substantial midpoint of the turntable 106 and a framework. The turntable 106 is configured to rotate about the fixed y-axis via a rotary index 118 that can be driven via a motor such as a servo motor 124 and a gear system 116.

In the illustrated embodiment, the turntable 106 moves in 90-degree increments so as to allow an operator to access each side of the four-sided turntable 106. In other embodiments, it is contemplated that the turntable 106 can move in any increments to provide access to various parts and/or components of the turntable 106. Additionally, the turntable 106 can comprise various shapes, dimensions, and sizes, depending upon embodiments. For example, the turntable 106 can comprise a hexagonal shape and can rotate in 60-degree increments. In another example, the turntable 106 need not move in a rotational motion. Instead, the turntable 106 can comprise a sliding mechanism for moving in a horizontal fashion (i.e., side-to-side with respect to a fixed x-axis). Alternatively, the turntable 106 can remain stationary.

The framework comprises a pair of base members 108, each base member 108 having a leg 112 extending upward and perpendicularly therefrom, wherein the legs 112 are connected to a support surface 114 at upper ends thereof. In various embodiments, the legs 112 can be adjustable in height. Further, the legs 112 can be connected below the support surface 114 via a horizontal connecting member 110 for stabilizing the legs 112 and securing them in place. One or more of the legs 112 can comprise a frame valve bank 134 attached thereto. The support surface 114 comprises the rotary index 118 extending therethrough, wherein the rotary index 118 can be driven via the servo motor 124 and gear system 116 mounted thereon. The support surface 114 further comprises a filter/regulator/lubricator assembly 136 mounted thereon.

Each of the sides of the turntable 106 comprises a screw hopper 102 that can be accessed via the rotary index 118. The screw hoppers 102 can comprise one or more user interface and input/output (I/O) interface. For example, the user interfaces may include a data output device (e.g., a visual display, audio speakers), and one or more data input devices. The data input devices may include but are not limited to, combinations of one or more keypads, keyboards, mouse devices, touch screens that accept gestures, microphones, voice or speech recognition devices, and any other suitable devices. In the illustrated embodiment, the user interface 104 comprises a touch screen for receiving user input such as a selection for specific screw color and/or screw type and displaying information.

The I/O interface may be any controller card, such as a universal asynchronous receiver/transmitter (UART) used in conjunction with a standard I/O interface protocol such as RS-232 and/or Universal Serial Bus (USB). In various embodiments, the screw hoppers 102 can further comprise a network interface such as Ethernet and/or Wi-Fi, wherein the network interface can work in concert with the I/O interface. The screw hoppers 102 can further comprise a memory unit that is operatively connected to one or more processors, wherein the memory unit is any computer-readable media that may store one or more software components to receive and analyze user input and output information, communicate with an operator, and/or so forth.

The screw hoppers 102 are attached to the upper surface of the turntable 106 via one or more fastening mechanisms such as a bracket on one end thereof and an air piston 122 on an opposite end thereof. Each terminal end of the air piston 122 can be connected to a pivot or similar fastening mechanisms for allowing the screw hoppers 102 to tilt or adjust in position. The screw hoppers 102 can comprise a defined interior volume or compartment for storing screws therein and an opening or dispensing means for dispensing screws therefrom. Each of the screw hoppers 102 comprises specific type and/or color of screws such that different screw hoppers 102 comprise different screw types and/or color. One or more screw hoppers 102 can also comprise more than one type and/or color of screws, depending upon embodiments.

The screw hoppers 102 comprise a plurality of rectangular plates 138 connected thereto. The rectangular plates 138 are arranged in a colinear fashion along the length of one end of the screw hoppers 102. Preferably, the rectangular plates 138 are disposed on the end of the screw hoppers 102 adjacent to where screws are dispensed. The plates 138 are positioned at an angle such that the screws can slide down the rectangular plates 138 into a screw pick off plate 142. The plates 138 are separated at regular intervals so as to form or define slots therebetween. The slots are dimensioned to prevent the screws from falling therethrough while allowing the screws to slide downward into the screw pick off plate 142. The screw pick off plate 142 is connected to one or more hopper screw drop hoses 140 that is further connected to a screw receiver 132. In this way, the screws that are dispensed from the screw hoppers 102 are guided into the hopper screw drop hoses 140 via the screw pick off plate 142 and into the screw receiver 132. It is noted that the screws can be gravitationally dropped down such that no additional force is required.

Each of the screw hoppers 102 is connected to the manifold 130 via the screw receiver 132, wherein the manifold 130 is disposed on the underside of the turntable 106 below the screw hoppers 102. The manifold 130 is configured to catch screws that are released and dropped from the screw hoppers 102. More specifically, the manifold 130 can catch screws that are released and dropped from the screw hoppers 102, slid down the rectangular plates 138, through the hopper screw drop hoses 140, and then into the screw receiver 132. In various embodiments, the turntable 106 can further comprise a chute having a first end (i.e., a mouth) that is aligned with the bottom of the rectangular plates 138 to catch the screws and a second end that connects to the manifold 130.

In various embodiments, the screw hoppers 102 and the manifold 130 are connected via a screw receiver 132 that can catch screws from the screw hoppers 102 when the screw hoppers 102 are in position for releasing screws into the manifold 130. In this regard, the screw receiver 132 intercepts the screws before the screws travel to the manifold 130. The screw receiver 132 comprises a compartment or a tray that can hold or store screws temporarily. The screw receiver 132 can move towards and away from the underside of the turntable 106 via an air piston or a similar mechanism for altering the height of the screw receiver 132 such that the screw receiver 132 can be directly adjacent to the underside of the turntable 106 when the screw hoppers 102 are in position for releasing screws into the manifold 130 to catch the screws before the screws travel into the manifold 130. In various embodiments, the screw receiver 132 can further comprise an opening or a chute to drop the screws into the manifold 130. The screw receiver 132 can operate in conjunction with a block off plate 126.

The block off plate 126 can be secured in place via a pivotable arm, a hinge, or a similar fastening mechanism disposed below the turntable 106. The block off plate 126 can be automatically engaged or activated to block air flow to one or more screw feed-hoses 128 that is connected to the manifold 130, for example, upon receiving a user input via the user interface from an operator. Alternatively, the block off plate 126 can be manually activated or positioned in place. For example, the block off plate 126 can be positioned over or away from the opening or the chute that is disposed over the manifold 130.

The screw feed-hoses 128 are further connected to screw drivers disposed on an auto-hinge applicator of a door assembly machine. In this regard, the screw feed-hoses 128 extend beyond the framework of the apparatus 100. Once the screws are dropped into the manifold 130, the screws are blown with compressed air (i.e., from an air tank integral to the apparatus or a separate air tank operatively connected to the apparatus) through the feed-hoses 128, and thereby to the screw drivers on the auto-hinge applicator.

Example Computing Device Components

The apparatus 100 and various components thereof may be implemented by one or more computing nodes of a distributed processing computing infrastructure. The number of computing nodes may be scaled up and down by a distributed processing control algorithm based on the data processing demands of the screw hoppers 102 and/or other components in the system. For example, during peak performance data processing times, the number of computing nodes that are executing data processing functionalities of the screw hoppers 102 may be scaled up on the fly based on processing demand. However, once the processing demand drops, the number of computing nodes that are executing the data processing functionalities may be reduced on the fly. Such scaling up and scaling down of the number of computing nodes may be repeated over and over again based on processing demand.

The computing nodes may include a communication interface, one or more processors, one or more hardware, and memory. The communication interface may provide graphical user interfaces and can include wireless and/or wired communication components that enable the one or more computing nodes to transmit data to and receive data from other networked devices. The computing nodes may be accessed via hardware. The hardware may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or another transmission mechanism.

The memory may include a host operating system (e.g., iOS™, Windows™, Linux™, etc.) and an application for receiving screw selections and remotely switching screw colors and/or types for door assembly machines. The application, when executed by the one or more processors, causes the one or more computing nodes to receive a screw selection for a screw type and/or color from an operator via a user interface 104 such as a touch screen, wherein the screw type and/or color corresponds to one of the screw hoppers 102 disposed on the turntable 106.

In various embodiments, the operator can specify the number of hinges for processing on the door assembly machine to dispense a specific number of screws. Upon receiving the screw selection, the one or more computing nodes identifies the screw hopper 102 corresponding to the selected screw type and/or color. After identifying the corresponding screw hopper 102, the rotary index 118 rotates the turntable 106 to position the corresponding screw hopper 102 in place to align with the manifold 130.

When the screw hopper 102 is in position, the screw receiver 132 can also be positioned to catch screws that are dispensed from the screw hopper 102 before the screws travel into the manifold 130. The block off plate 126 can block the air flow that pushes the screws into the screw feed-hoses 128. In various embodiments, the block off plate 126 blocks the air flow until the screws are ready to be blown with compressed air into the screw feed-hoses 128. In some embodiments, the block off plate 126 can be engaged until receiving a user input that correct screw type and/or color has been selected. Upon receiving a user input that correct screw type and/or color has been selected, the block off plate 126 engages to block air from flowing upwards, allowing compression to force injected air in a downward flow, causing the screws to feed into the feed-hoses 128. In various embodiments, the block off plate 126 can automatically be disengaged or moved to allow air flow if the operator does not cancel the screw selection within a predetermined period of time.

If an incorrect screw selection is made or there is an operator error, the operator can clear the screw selection and make a new screw selection. After receiving the new screw selection, the one or more computing nodes can identify a new screw hopper corresponding to the new selected screw type and/or color in order to position the correct screw hopper in place and release screws therefrom, thereby re-feeding screws into the manifold.

Upon releasing screws into the manifold 130, the screws are blown into the screw feed-hoses with compressed air via an air tank in order to guide the screws through screw feed-hoses that connect to screw drivers on a hinge applicator of the door assembly machine. Thereafter, the correct screws are fed to the hinge applicator after the previous hinge is attached and hinge applicator has un-clamped.

It is noted that screws can be reloaded into the screw hoppers when rotated in alignment with the hinge side of the door assembly machine. In this regard, the screw hopper 102 can provide notifications when screws need to be reloaded. For example, the screw hopper 102 via the user interface 104 can provide visual and/or audio alerts when the screw hopper 102 is empty and/or when the number of screws falls below a predetermined threshold. In various embodiments, the user can also make a selection for manual feed by deactivating auto-feed function on the user interface and using a push-button mounted on the hinge applicator when feeding the screws.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A rotary screw changing delivery system for a construction/building type door assembly machine with an auto-hinge applicator, comprising:
   a turntable that is supported on bearings and a framework;
   at least two screw hoppers secured to the turntable, wherein the at least two screw hoppers are configured to dispense screws stored therein;
   a manifold connected to the at least two screw hoppers to receive the screws therefrom;
   a processor configured to:
   receive a screw selection for a screw type;
   identify a screw hopper of the at the at least two screw hoppers corresponding to the selected screw type;
   index and rotate the identified screw hopper into a position aligned with the manifold to connect the identified screw hopper to the manifold via a rotary index; and
   at least one screw feed-hose connected to the manifold to deliver the screws from the manifold to screw drivers on the auto-hinge applicator of the door assembly machine,
   wherein during use of the system, at least two screws corresponding to the selected screw type from the identified screw hopper are released into the manifold, wherein the screws drop the screws drop gravitationally downward into the manifold, and
   wherein the at least two screws are blown through the at least one screw feed-hose corresponding to the identified screw hopper, wherein the at least one screw feed-hose connects to the screw drivers on the auto-hinge applicator of the construction/building type door assembly machine.

2. The rotary screw changing delivery system of claim 1, wherein the rotary index is driven via a motor and a gear system, wherein the rotary index is configured to move the screw hopper in 90-degree increments.

3. The rotary screw changing delivery system of claim 1, further comprising: a touch screen for receiving the screw selection via a user input; upon receiving the screw selection, the identified screw hopper having the screws that correspond to the screw selection configured to index into a position for dispensing the screws.

4. The rotary screw changing delivery system of claim 1, wherein the screws are blown into the at least one screw feed-hose with compressed air.

5. The rotary screw changing delivery system of claim 1, further comprising: a screw receiver configured to move toward and away from an underside of the turntable, wherein the screw receiver moves toward the underside of the turntable to directly contact the underside of the turntable when the identified screw hopper is correctly positioned to dispense the screws into the manifold.

6. The rotary screw changing delivery system of claim 1, further comprising: a block off plate for preventing air flow to the at least one screw feed-hose.

7. The rotary screw changing delivery system of claim 1, further comprising: a plurality of rectangular plates connected to the at least two screw hoppers for guiding the screws into the manifold.

8. The rotary screw changing delivery system of claim 1, wherein the at least two screw hoppers can be adjustably tilted via an air piston.

* * * * *